UNITED STATES PATENT OFFICE 2,417,041

REMOVAL OF SULFUR COMPOUNDS FROM HYDROCARBON OILS

George W. Ayers, Chicago, Daniel M. Barton, Elmwood Park, and Erskine E. Harton, Evanston, Ill., assignors to The Pure Oil Company, Chicago, Ill., a corporation of Ohio No Drawing. Application December 17, 1943, Serial No. 514,670

9 Claims. (Cl. 196—30)

The object of this invention is to provide a method for removing sulfur and sulfur compounds from hydrocarbon oils and particularly to provide a method for removing small quantities of residual sulfur from hydrocarbon oils which cannot be removed or are removable with difficulty by other processes. We have discovered that if hydrocarbon oils which have been treated with aqueous caustic alkali solutions, caustic alkali-methanol solutions or which have been sweetened with doctor reagent or copper chloride and oxygen followed by re-running, to remove the bulk of the mercaptans and/or other sulfur compounds, are subsequently treated with specially prepared reagent, the small amount of residual sulfur can be substantially eliminated.

The reagent used by us is prepared by reacting powdered alloy composed of a metallic hydrogenation catalyst such as nickel or copper and one or more metals which are readily attacked by alkali metal hydroxide, such as aluminum, silicon, beryllium and zinc, with concentrated aqueous alkali metal hydroxide solution, as for example an aqueous solution containing 20% by weight of sodium hydroxide, and preventing substantial rise of temperature above normal atmospheric temperature during the reaction between the alloy and the alkali hydroxide solution. Alloys which are useful in preparing our reagent are disclosed in Patents Nos. 1,563,587; 1,628,190 and 1,915,473. Rise in temperature causes evolution of occluded hydrogen from the specially prepared reagent, thereby lessening its effectiveness. Rise in temperature may be readily prevented by floating ice in the caustic alkali solution before or after the reaction begins.

As an example of the preparation of our special reagent, 50 grams of powdered nickel-aluminum alloy was added slowly to 310 grams of aqueous sodium hydroxide solution containing 20% by weight of sodium hydroxide. The material was allowed to stand overnight at room temperature. Next day the solid material was washed six times with 300 cc. portions of water and the water decanted after each wash. The solid was then washed three times with 250 cc. portions of 99% methanol.

The resulting reagent was used to treat gasoline, a portion of which had been previously subject to treatment with fortified aqueous sodium hydroxide solution prepared by mixing together 18.3 parts by weight of sodium hydroxide, 18.7 parts by weight of naphthenic acids, 6.3 parts by weight of commercial cresol and 56.7 parts by weight of water, as disclosed in Patent No. 2,297,- 621; and another portion of which had been treated with fortified caustic soda made by adding thereto high boiling acids such as are disclosed in Patent No. 2,316,966. The blended gasoline contained 0.0026% of mercaptan sulfur and 0.215% of total sulfur after treatment with the caustic soda solutions.

A 100 cc. sample of the aforesaid gasoline was mixed with approximately one-third of the reagent as above described together with some of the methanol in which the reagent had been allowed to stand, and was stirred occasionally for 20 to 25 minutes at room temperature. The gasoline was then filtered through filter paper and the mercaptan sulfur and total sulfur again determined. Mercaptan sulfur content was 0.0008% and the total sulfur content was 0.076%.

Another sample of the gasoline was treated in the same manner as the first sample with the same quantity of the specially prepared reagent on a steam bath. The mercaptan content of the gasoline so treated was 0.0000% and the total sulfur was 0.073%, thereby indicating that heating of the mixture of gasoline with the specially prepared reagent causes complete removal of mercaptan, but does not materially reduce the total sulfur below the value resulting from treatment at room temperature.

The amount of specially prepared reagent which is required for desulfurization can be readily determined by calculating the quantity of nickel or other dehydrogenating metal required to form the metal sulfide with the sulfur present in the oil.

In accordance with our invention the specially prepared reagent is used to treat the gasoline or other hydrocarbon oil after it has been subject to pre-treatment by any known process for removing the bulk of the sulfur compounds from the oil. As previously pointed out, pre-treatment of the oil may be in the nature of a process which extracts hydrogen sulfide and mercaptans directly from the oil, such as treatment with aqueous alkali followed by alcoholic alkali or aqueous alkali solution containing solubility promoters of the nature of alkyl phenols, isobutyric acid and naphthenic acids; or it may be in the nature of a sweetening process, such as doctor treatment or copper chloride-air treatment, which converts the mercaptans to disulfides followed by re-running to separate the disulfides from the oil. Although our specially prepared reagent may be used to remove sulfur compounds from low sulfur-containing oils which are not pre-treated, it becomes readily poisoned in the presence of large amounts of sulfur compounds and will not remove the sulfur in proportion to the amount of metal present. However, after the major portion of the sulfur compounds have been removed, our specially prepared reagent will react rapidly in substantially stoichiometric proportions with the sulfur to eliminate sulfur from the oil.

Our specially prepared reagent may be mixed with the oil to be treated or the oil may be passed through a bed thereof. Care should be exercised in handling the reagent to prevent contact thereof with the air since it undergoes spontaneous combustion. It should be stored and kept under liquid such as water, alcohol or gasoline.

It is preferred to use in our invention reagent which has been freshly prepared from the nickel-aluminum or other alloy since upon standing hydrogen slowly evolves from the product and lowers its effectiveness. Our specially prepared reagent may be used to treat gasoline or other liquid hydrocarbons at atmospheric temperature or at temperatures up to 100° C. or higher. The contact time between the liquid undergoing treatment and the reagent may be from a few seconds to approximately a half hour. Longer periods of contact are unnecessary since the reaction proceeds to substantial completion within this period of time.

Although we have disclosed the use of a 20% sodium hydroxide solution in preparing the reagent, it is to be understood that solutions of various concentrations may be used and that other alkalies such as a potassium hydroxide, may be substituted for sodium hydroxide. Sufficient alkali metal hydroxide should be present to react with all the aluminum, silicon, beryllium and/or zinc present in the alloy.

It is claimed:

1. The method of reducing the sulfur content of hydrocarbon oil containing organic sulfur compounds of the group consisting of mercaptans and disulfides comprising contacting the liquid oil at temperatures not substantially in excess of 100° C. with the solid reagent resulting from the action at temperatures not substantially in excess of normal atmospheric temperature of an alkali solution on an alloy containing an element selected from the group consisting of aluminum, silicon, beryllium and zinc and a metal selected from the group consisting of nickel and copper.

2. Method in accordance with claim 1 in which the alloy is a nickel-aluminum alloy.

3. Method in accordance with claim 1 in which the alloy is a nickel-silicon alloy.

4. Method in accordance with claim 1 in which the alloy is a nickel-beryllium alloy.

5. The method in accordance with claim 1 in which the reagent is washed with water and maintained under a neutral liquid until used for treating the oil.

6. Method in accordance with claim 1 in which a sufficient amount of reagents is contacted with the oil to at least equal the stoichiometric amount required for the metal which functions as a hydrogenation catalyst to react with all the sulfur present in the oil to form the metal sulfide.

7. The method of lowering the sulfur content of hydrocarbon oil containing organic sulfur compounds from the group consisting of mercaptans and disulfides comprising treating the liquid oil at temperatures not substantially in excess of 100° C. to remove the major portion of the mercaptans contained therein and then contacting the oil with a solid reagent prepared by reacting an alloy of nickel and an element selected from the group consisting of aluminum, silicon, beryllium and zinc with sufficient aqueous alkali metal hydroxide at temperatures not substantially above normal atmospheric temperature to dissolve substantially all of the element of the aforesaid group.

8. The method of reducing the sulfur content of hydrocarbon oil containing organic sulfur compounds from the group consisting of mercaptans and disulfides comprising contacting the oil in liquid phase at temperatures not substantially above 100° C. with the solid reagent resulting from the action at temperatures not substantially in excess of normal atmospheric temperature of an aqueous alkali solution on alloy of nickel and aluminum.

9. Method in accordance with claim 8 in which sufficient reagent is contacted with the oil to at least equal the amount stoichiometrically required to react with all the sulfur present in the oil to form nickel sulfide.

GEORGE W. AYERS.
DANIEL M. BARTON.
ERSKINE E. HARTON.

REFERENCES CITED

The following references are of record in the file of this patent:

UNITED STATES PATENTS

| Number | Name | Date |
| --- | --- | --- |
| 2,037,789 | Ipatieff | Apr. 21, 1936 |
| 2,037,792 | Ipatieff | Apr. 21, 1936 |
| 2,037,790 | Ipatieff | Apr. 21, 1936 |
| 1,930,216 | Weber | Oct. 10, 1933 |
| 2,337,358 | Szayna | Dec. 21, 1943 |
| 2,128,985 | Carmody | Sept. 6, 1938 |
| 2,371,641 | Mozingo | Mar. 20, 1945 |
| 2,371,642 | Mozingo | Mar. 20, 1945 |